J. G. McDOWELL.
MOTOR FOR PUMPS AND OTHER PURPOSES.
APPLICATION FILED JAN. 7, 1909.
1,023,214.
Patented Apr. 16, 1912.
4 SHEETS—SHEET 1.
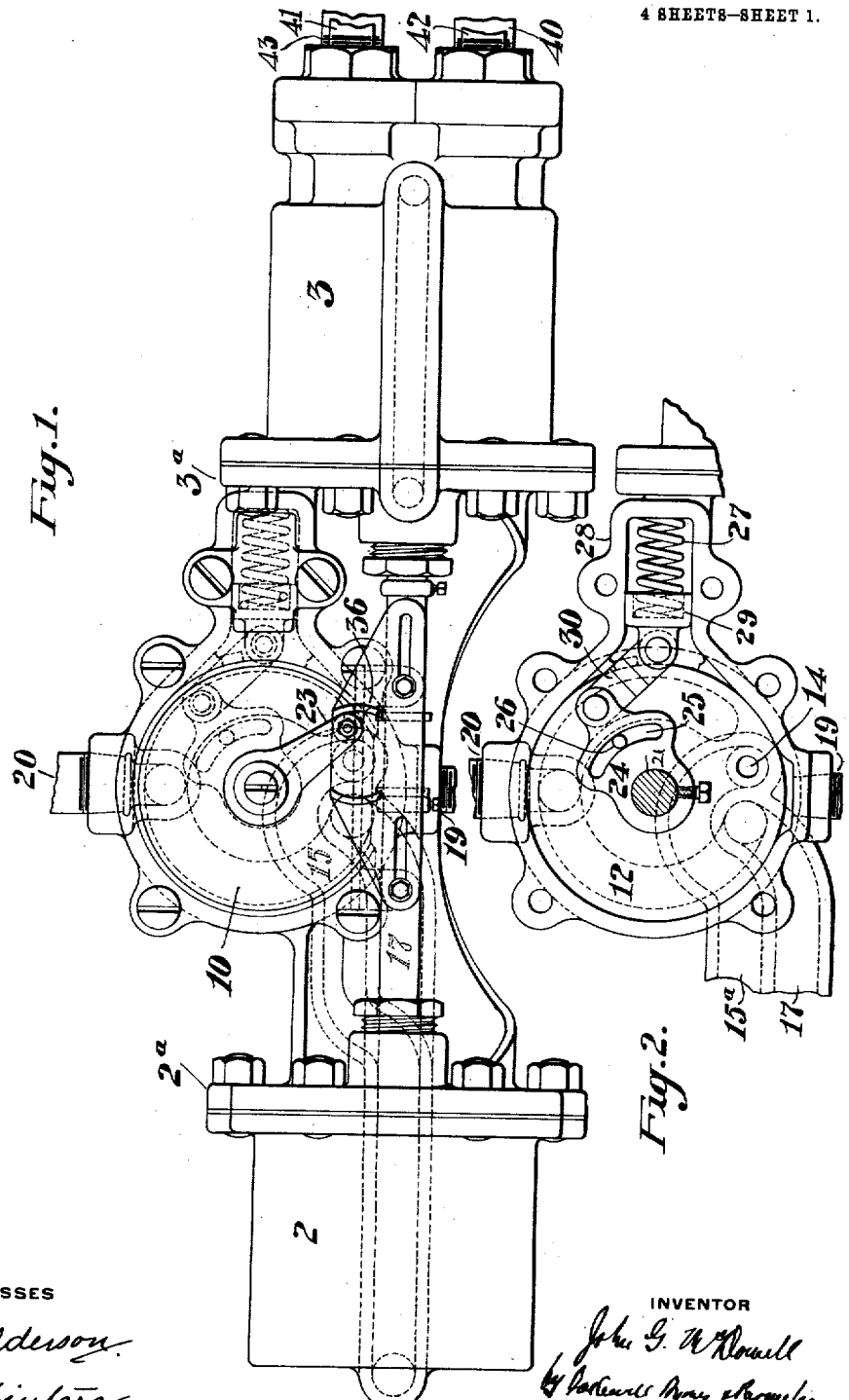
WITNESSES
INVENTOR

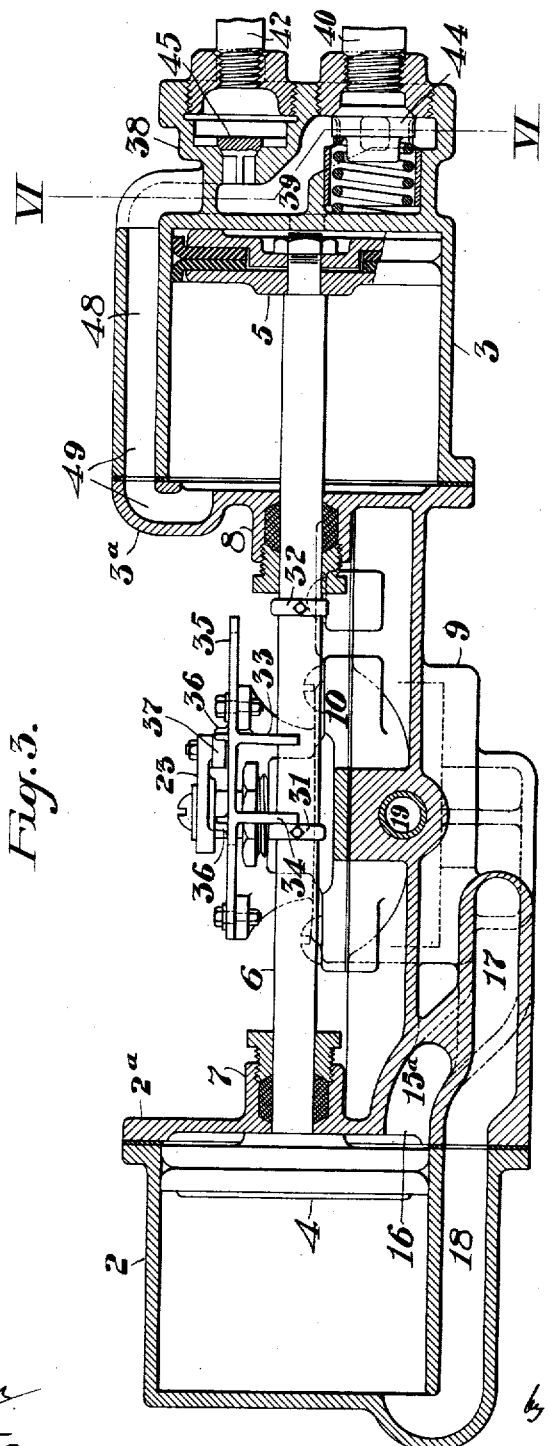

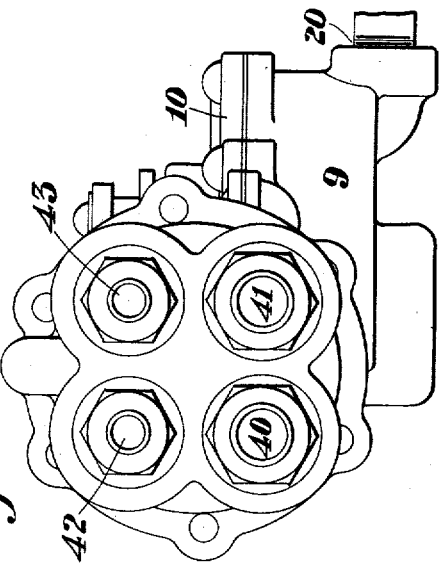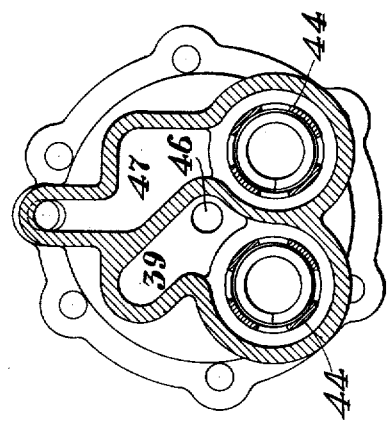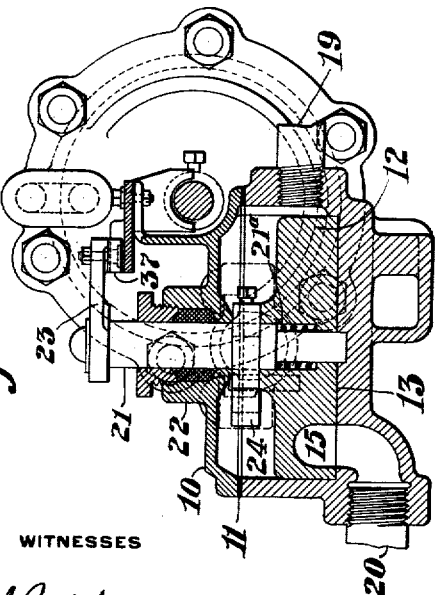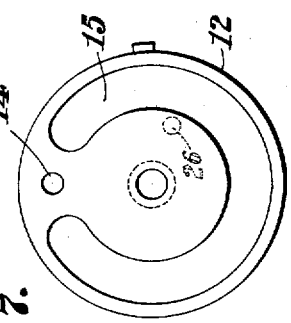

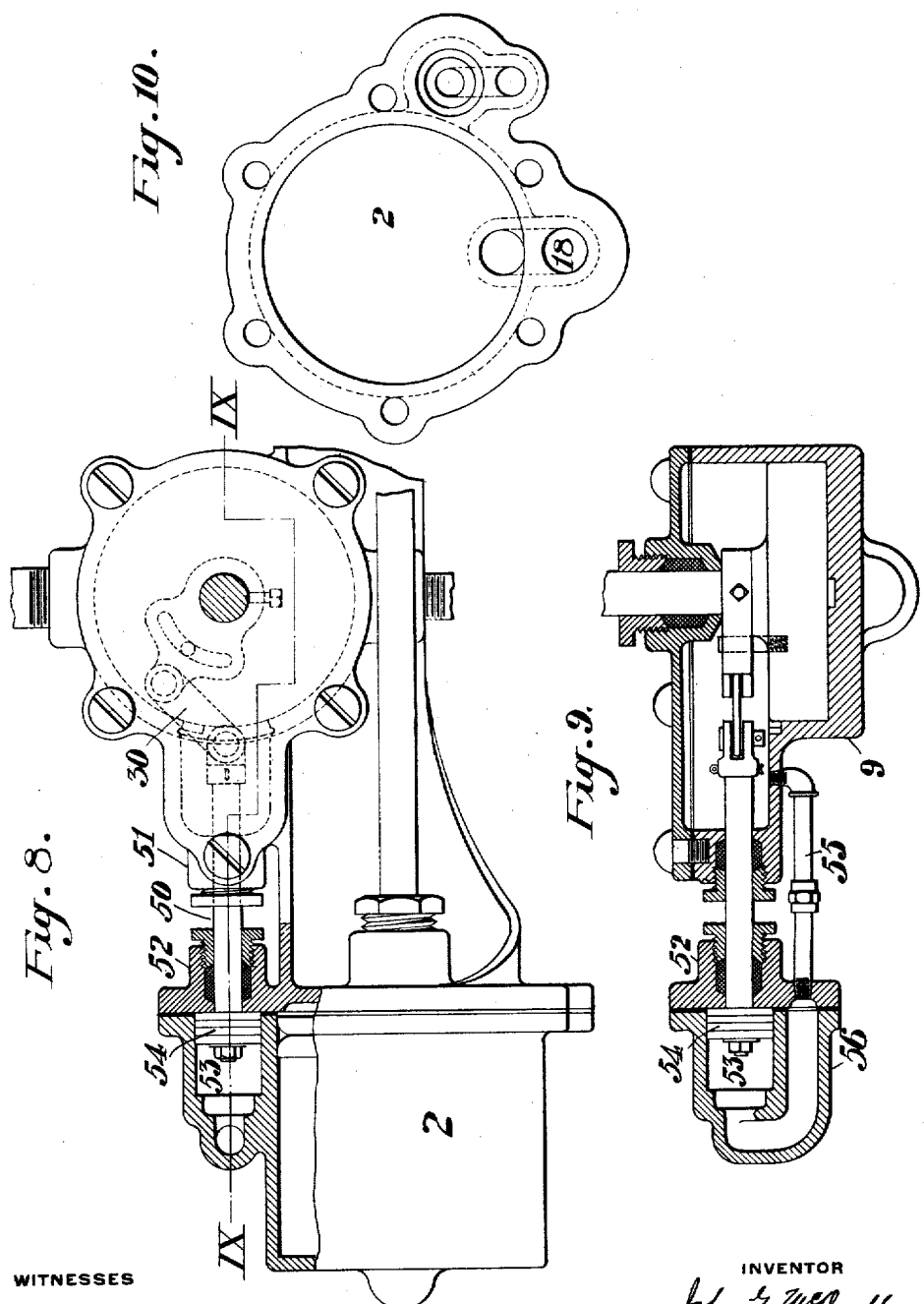

UNITED STATES PATENT OFFICE.

JOHN G. McDOWELL, OF PITTSBURGH, PENNSYLVANIA.

MOTOR FOR PUMPS AND OTHER PURPOSES.

1,023,214. Specification of Letters Patent. Patented Apr. 16, 1912.

Application filed January 7, 1909. Serial No. 471,080.

*To all whom it may concern:*

Be it known that I, JOHN G. McDOWELL, of Pittsburgh, in the county of Allegheny and State of Pennsylvania, have invented a new and useful Improvement in Motors for Pumps and other Purposes, of which the following is a full, clear, and exact description, reference being had to the accompanying drawings, forming part of this specification, in which—

Figure 1 is a plan view of a pump motor embodying my invention; Fig. 2 is a plan view of the valve casing and valve, the cover of the casing being removed; Fig. 3 is a longitudinal vertical section; Fig. 4 is a sectional view of the valve casing and valve; Fig. 5 is an end view of the pump cylinder; Fig. 6 is a section on the line VI—VI of Fig. 3; Fig. 7 is a bottom plan view of the valve removed; Fig. 8 is a plan view partly in section of a modified form of valve-actuating mechanism; Fig. 9 is a section on the line IX—IX of Fig. 8; and Fig. 10 is an end view of the power cylinder My invention has relation to motors, and is more particularly, but not necessarily, designed for operating pumps at the bottom of a well or other source of water supply.

The invention is also designed to provide novel valve means for controlling the action of the motor.

The nature of my invention will be best understood by reference to the accompanying drawings, which will now be described, it being premised, however, that various changes may be made in the details of construction and arrangement of the parts, without departing from the spirit and scope of my invention, as defined in the appended claims.

In these drawings, the numeral 2 designates a double acting power cylinder, and 3 a double-acting pump cylinder, the two cylinders being placed end to end in axial alinement and separated from each other by an intervening space in which is located the valve mechanism, hereinafter described.

4 is the piston in the power cylinder; and 5 is the piston in the pump cylinder, the two pistons being connected by the piston rod 6, which passes through the stuffing boxes 7 and 8 on the inner heads of the two cylinders.

9 designates a valve casing, which is located intermediately of the two cylinders, below the piston rod. This valve casing is of cylindrical form and has a removable cap plate or cover 10, provided with a suitable packing 11, whereby the casing is rendered water and steam or air-tight.

12 designates the controlling valve for the power cylinder 2, this valve being of circular or disk form and seated upon the bottom wall 13 of the valve casing. The valve is formed with an inlet port 14, extending vertically therethrough, and its under side is hollowed out or cut away to form the chamber or port 15, which extends around the major portion of the circumference of the valve and between the ends of which is located the port 14, before referred to.

In the construction shown, the body of the valve chamber and the inner heads 2ª and 3ª of the cylinders 2 and 3 are formed in one integral casting and cored in said casting is a circulating port 15ª, which extends from the valve chamber 9 to the adjacent end of the cylinder 2, with which it communicates by the opening 16. Said casting has also cored therein a second circulating port 17, which registers with a port 18, formed in the lower portion of the wall of the cylinder 2, and communicating with the opposite end of said cylinder from the port 15. The port 14 of the valve is designed to be alternately brought into register with the ends of the ports 15ª and 17, which extend into the valve chamber.

19 designates the inlet for the valve chamber and 20 the outlet or exhaust, the former being shown as communicating with said chamber at one side of the valve 12 and the latter as extending through the lower wall of said chamber into communication with the port or space 15 in the under side of the valve.

The valve 12 is loosely mounted on the lower end of a vertical post or spindle 21, which extends upwardly through a stuffing box 22, on the top of the cover plate 10, and has secured to its upper projecting end a tappet arm 23. Secured to the post or spindle 21, within the valve chamber above the valve is an arm 24, having therein a curved slot 25, which is loosely engaged by a pin or stud 26, projecting upwardly from the top of the valve.

27 is a spring which is seated in an offset portion 28 of the valve casing, said spring bearing at its outer end against the wall of said off-set portion and at its inner end against a movable cap 29, which is connected by a link 30, with the outer end of the arm 24.

21ª is a spring interposed between a shoulder of the post or stem 21, and the valve and which acts to hold the valve to its seat.

Adjustably secured to the piston rod 6 are two collars or other projections 31 and 32, which, as the piston rod reciprocates, are designed to engage respectively depending projections 33 and 34 on the under side of a slide plate 35. The slide plate 35 is provided on its upper side with the two projections 36, having concaved inner faces (see Fig. 1) between which extends the end of the tappet arm 23, before referred to, said arm being preferably provided with an antifriction roller 37, for engagement with these concaved faces (see Fig. 4).

The pump cylinder 3 is provided on its outer end with an extension 38, containing a chamber 39, having the two inlet connections 40 and 41, and the two outlet connections 42 and 43. Each of the inlet connections is provided with a spring-seated check valve 44 and each of the outlet connections with a check valve 45. One of the inlet valves 44 communicates with the chamber 39, which, in turn, communicates with one end of the cylinder 3 by the port 46 (see Fig. 6). The other inlet valve communicates with the opposite end of the cylinder by the ports 47, 48 and 49 (see Figs. 3 and 6).

The operation is as follows: Water, steam, air, or other motive fluid, is admitted to the valve casing at the inlet 19, and with the valve in one of its positions passes, through the ports 14 and 15 into one end of the power cylinder 2. The exhaust from the opposite end of the cylinder passes out through the ports 17 and 18 and from the port 18 into the valve port 15, and thence to the exhaust 20. As the piston rod moves to the left, looking at Fig. 3, the collar or projection 32 comes in contact with the arm or projection 33 of the slide plate 35. This moves the slide plate endwise and causes one of the projections 30 to engage and move the tappet arm 24, thereby turning the valve post or spindle 21. The arm 24, which is rigidly attached to said post or spindle, turns with the spindle, but does not actuate the valve until the end of the slot 25 comes in engagement with the pin or stud 26 (see Fig. 2). During this idle movement of the arm 24, the spring 27 is being compressed and at about the time the end of the slot comes in engagement with the pin or stud 26, the link 30 has been moved to a position in which its center is substantially in line with the longitudinal center of the spring 27. As soon as this point is passed, the spring is released and acts at once to throw the valve. It will now be understood that the movement of the arm 24 caused by the tappets 31 and 32 operates to store energy in the spring 27, which afterward operates as a valve throwing motor. This reversal of the valve shifts the port 14 out of register with the port 15 and into register with the port 17, and thus connects the opposite end of the cylinder with the valve chamber. The same movement of the valve brings the valve port 15 into exhaust connection with the port 17. This shifting operation of the valve occurs during each stroke of the piston rod. It will be seen that the valve is held in one of its shifted positions until the proper time for reversal, when it is moved quickly to its other shifted position by the action of the spring 27.

In the modification shown in Figs. 8, 9 and 10, instead of the spring 27, I connect the link 30 to the end of a piston rod 50 which extends through the stuffing boxes 51 and 52, and into a cylinder 53 at one side of the power cylinder 2. 54 is a piston within the cylinder 53 and carried by the rod 50. 55 designates a supply connection leading from the valve chamber 9 to a port 56, which opens into the far end of the cylinder 53. By means of the connection 55 and port 56, the cylinder 53 is at all times supplied with motive fluid, acting against the piston 54. This pressure is utilized to reverse the valve in the same manner as the pressure of the spring in the form first described. The cylinder 53 and piston 54 operate as a valve-controlling motor as explained for the spring 27.

It will be obvious that many changes can be made in the details of construction and arrangement of the parts, without departing from the spirit and scope of my invention as defined in the claims. Thus, the construction of the motor cylinder and of the base casting may be changed, and the arrangement of the cylinder ports varied; the motor may be used for operating other forms of pumps, or for any other desired purpose, and the details of the valve and valve operating devices may be changed.

I claim:

1. In a motor, a motor cylinder, a piston therein, an oscillatory valve for controlling said motor, a spindle or stem for said valve having a lost motion connection with the valve, an auxiliary motor supplied from the same source as the said motive cylinder, and having its piston connected to the said spindle or stem, and a lost motion connection between the valve stem and the main motor piston; substantially as described.

2. In a motor, a motor cylinder, a piston therein, a valve casing having ports extending therefrom to opposite ends of the cylinder, an oscillating valve controlling said ports, a valve spindle having a lost motion connection with the valve, a connection exteriorly of the valve casing between the spindle and the main piston, an auxiliary motive cylinder, a piston therein, an arm secured to the said spindle, and a connection between the last named piston and the said arm; substantially as described.

3. A motor having a cylinder and a piston therein, a valve casing having ports leading to the cylinder, an oscillating valve in said casing and controlling said ports, an oscillating valve spindle extending vertically through the top of the casing, a lost motion connection between said stem and the motor piston, an arm secured to the spindle within the casing and having a lost motion connection with the valve, and a valve throwing motor also connected to said spindle; substantially as described.

4. In a motor, a cylinder, a piston therein, and a controlling valve for the cylinder, said valve having a stem or spindle connection, means for starting said stem or spindle in motion by the stroke of the main piston, said stem or spindle having an eccentric arm attached thereto, and an auxiliary motive device connected to said arm and acting to complete the movement of the stem or spindle to throw the valve from one of its controlling positions to the other controlling position; substantially as described.

In testimony whereof, I have hereunto set my hand.

JOHN G. McDOWELL.

Witnesses:
GEO. B. BLEMING,
GEO. H. PARMELEE.

Copies of this patent may be obtained for five cents each, by addressing the "Commissioner of Patents, Washington, D. C."